Sept. 11, 1962 G. R. AMBROSE 3,053,437
TURBO-FAN ROTOR HUB
Filed Oct. 18, 1960
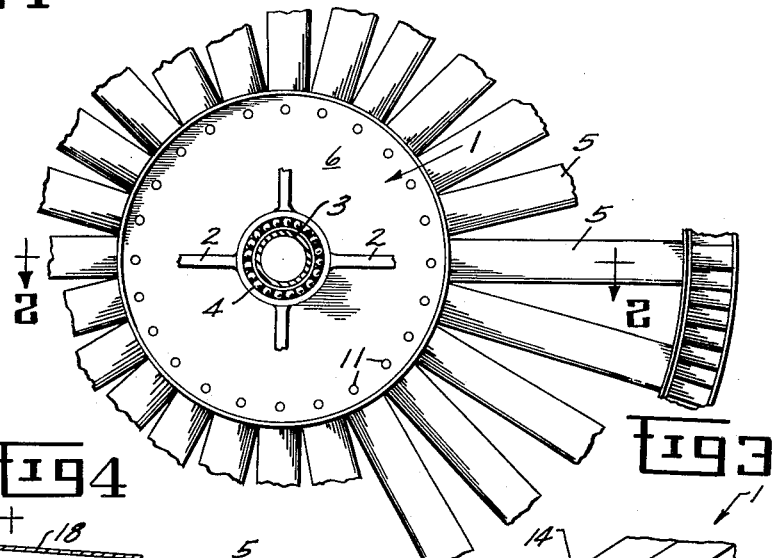
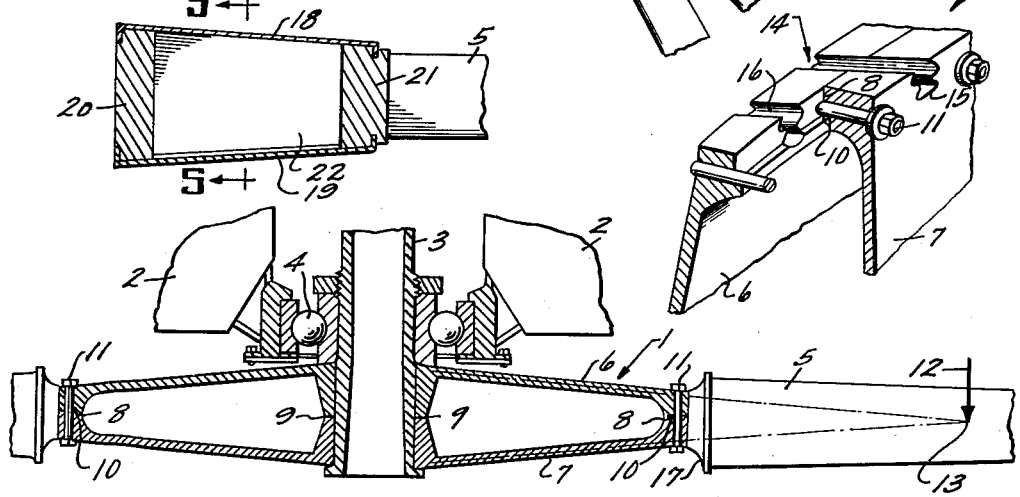
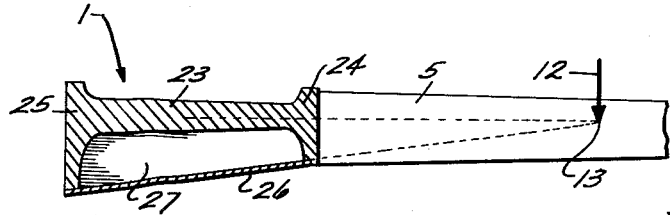
INVENTOR.
GEORGE R. AMBROSE
BY
*John F. Cullen*
ATTORNEY—

United States Patent Office 3,053,437
Patented Sept. 11, 1962

3,053,437
TURBO-FAN ROTOR HUB
George R. Ambrose, Cincinnati, Ohio, assignor to General Electric Company, a corporation of New York
Filed Oct. 18, 1960, Ser. No. 63,317
5 Claims. (Cl. 230—134)

This invention relates to an improved hub for mounting the blades of a turbo-fan rotor, and more particularly, to a hub giving high axial rigidity to a turbo-fan rotor having application in vertical take-off aircraft.

In lift fans for vertical take-off aircraft, the hub which mounts the fan blades extending radially outward therefrom must have high axial rigidity. This rigidity is necessary to prevent excessive axial deflections of the blade tips due to aerodynamic loads upon the blades and loads encountered by maneuver of the aircraft under gyroscopic and inertial forces and to prevent the occurrence of undesirable resonant vibration loads in the rotor which, without the desired rigidity, can occur when the rotor is driven in the operating speed range. Problems in the design of such a rotor arise from limitations upon the diameter of the hub relative to diameter of the fan blades, since the essential lift is produced, not by the hub but by the blades which it carries. Moreover, a lift fan, to be successfully operable in a vertical take-off aircraft, must have a relatively high lift to weight ratio. This imposes a severe limitation of weight upon the construction of the fan hub. Finally, mounting space considerations place a limitation upon the depth or axial length of the hub. A satisfactory fan hub must therefore afford high strength and rigidity at a minimum of size and weight.

The object of this invention is to provide an improved blade-mounting hub for a turbo-fan rotor.

Another object is to provide a blade-mounting hub for the lift fan of a vertical take-off aircraft.

Still another object is to provide a blade-mounting hub for a turbo-fan rotor having optimum weight dimensions while providing necessary rigidity to the entire rotor.

Briefly, and in accordance with one aspect of the invention, the rotor hub is formed of two opposed disc members having their respective peripheral rims spaced from one another by a distance less than that separating their respective centers. It will thus be apparent that at least one of the discs is of non-planar configuration. The rims of the two opposed discs are joined in a solid connection, the connected rims then forming the periphery of the rotor hub. The rotor fan blades are radially mounted about the periphery of the rotor hub so formed. The basic concept of the invention resides in the design of the hub so that, when viewed in cross-section, the generatrices of the two opposed discs intersect or converge at a point radially outward from the periphery of the hub corresponding essentially to the point of axial load application upon the fan blades. Thus, if the point along a given fan blade is calculated at which the load of bending and moment forces can be considered as concentrated, this is essentially the point at which the generatrices of the rotor discs, along a section including the blade, will intersect.

Further objects, features and attendant advantages of the invention will become apparent by reference to the following specification and drawings, in which:

FIGURE 1 is a fragmentary plan view of the rotor hub of this invention;

FIGURE 2 is enlarged sectional view of the rotor taken along line 2—2 of FIGURE 1;

FIGURE 3 is a fragmentary perspective view of a portion of the rotor of this invention showing one form of blade retaining means;

FIGURE 4 is an alternative embodiment of the rotor hub illustrated in FIGURE 2;

FIGURE 5 is a sectional view taken along the line 5—5 of FIGURE 4; and,

FIGURE 6 is still another alternative embodiment of the rotor hub illustrated in FIGURES 1 and 2.

With reference to FIGURE 1, the rotor hub, generally indicated at 1, is mounted to rotate relative to a fixed strut 2 or similar support member of the airframe. The rotational mounting of the rotor hub 1 is not a part of the present invention and may be accomplished by any suitable means. For purposes of illustration, the rotor hub 1 may be arranged to rotate integrally with a shaft 3 which is, in turn, rotatable with respect to the airframe strut 2 by means of suitable bearings 4. Carried about the periphery of the rotor disc 1 are a plurality of fan blades 5, which when driven by suitable means, may be used to generate the axial flow of air to furnish lift for a vertical take-off aircraft. The propelling force for the rotor of this invention may be provided by any suitable means. For example, propelling gases from a source such as the exhaust of a conventional jet engine may be directed against turbine vanes or buckets carried about the periphery of the fan rotor. Such propelling means form no part of this invention, and are therefore not shown.

With reference to FIGURE 2, rotor disc 1 is comprised generally of two disc members 6 and 7 spaced apart in opposed relation. Disc members 6 and 7 are connected in junctions 8, 9 at the outer and inner peripheries, respectively. As illustrated in FIGURE 2, outer peripheral junction 8 may comprise a rabbeted portion 10, and may be secured as by brazing or by suitable bolts 11. It will be seen by reference to FIGURE 2 that the inner peripheral portions of disc members 6 and 7 which unite in junction 9 have the effect of spacing the disc members farther apart than do the outer peripheral portions which unite in junction 8. Thus, disc members 6 and 7 are somewhat conical in configuration, in that they are spaced farther apart at their respective centers, i.e., at their junction with shaft 3, than they are at their outer peripheral rims.

In FIGURE 2, an arrow 12 represents the application upon blade 5 of forces due to maneuver and other inertial and/or aerodynamic operating loads. The load forces represented by arrow 12 may be considered to be concentrated at a point 13 on blade 5. In accordance with the invention, the generatrices of the mating disc members 6 and 7, when viewed in section, will intersect at the point 13. It will thus be understood that disc members 6 and 7 are so designed that, if radially extended, they would intersect in the vicinity of a circle representing the locus of points of axial load application upon each individual fan blade.

In accordance with the invention, a suitable firm abutment of blades 5 to the outer periphery of the hub 1 is provided in order to insure unitary construction and hence, the rigidity necessary to resist the axial forces to which the entire rotor is subjected. This abutment and the means for securing blades 5 to rotor hub 1 may take the form of a plurality of dovetail slots, one of which is generally indicated at 14 in FIGURE 3.

The slots have grooved side walls 16 to cooperate with mating groove at the root end of a blade 5 and with the bottom surface 15 of the slot, the slots preferably occurring within the thick portion of the disc rims as shown. The blades 5, for this configuration, are held in place against axial sliding by any suitable means, not shown, such as plates or cover members bolted over the ends of slots 14. Other common means of attaching the blade 5 to the hub 1 such as pinned or bolted joints may be used. In any case, the blades 5 form an integral part of the hub 1 under operating conditions where rigidity of the joint may be obtained by centrifugal force or by a rigid mechanical joint.

Where dictated by the width of blade 5, the outer periphery of hub 1 or shank of the blade may be axially flared as at 17 for aerodynamic reasons. The flared portion so formed will incorporate the firm abutment and means described above for rigidly securing fan blades 5 to rotor hub 1.

Rotor disc 1 may take the form of alternative embodiments. In FIGURES 4 and 5, for example, disc members 6 and 7 may take the form of two opposed sheet metal webs 18 and 19, spaced from one another by solid inner and outer ring members 20 and 21, respectively. Ring member 20 is of greater axial width than ring member 21 by a degree sufficient to cause the generatrices of webs 18 and 19 to converge essentially at the locus of points of axial load application upon the attached fan blades. In this modification, stability can be added to the structure by the provision of radial ribs 22.

Still another modification is illustrated in FIGURE 6. In this embodiment, disc 1 may take the form of a central web 23 having peripheral flange portions 24 and 25, to the latter of which are attached the blades 5. In accordance with the invention, a conical disc member 26 is mated with the flat web 23. Flange portion 25 is of greater axial width than flange portion 24 by a degree sufficient to cause web 23 and disc member 26, if extended, to intersect at the locus of points 13 of axial load application 12 upon the attached blades. As in the embodiment of FIGURE 4, stability can be added to the structure by the provision of radial ribs, such as 27.

In a modification of this embodiment, the disc 26 as a strengthening member could be eliminated, and the ribs 27 reinforced and provided with flanges co-planar with the disc 26 the view appearing substantially the same as shown in FIGURE 6. To reduce windage losses in such a modification, a suitable thin, sheet metal web may be fixed about the rib flanges in the manner of the disc webs 18 and 19 illustrated in FIGURE 4.

While the foregoing description has illustrated the invention as adaptable to various structural embodiments, it will be understood by those skilled in the art that the basic concept of the invention resides in the arrangement of the two opposed disc members such that if radially generated or extended, these members will intersect in the vicinity of a ring or circle radially outward of the hub and representing the locus of points where axial load forces upon the rotor blades are concentrated. The effect of the arrangement thus described can be likened to a truss, using the inherent rigidity of the triangle. This effect is obtained by an arrangement wherein membrane stresses are carried by the two opposed convergent hub discs representing convergent sides of a truss, these sides being completed by the body of the fan blades themselves, which are substantially integral with the hub disc so formed. It will be understood that the rotor of this invention will behave slightly different when subjected to axial deflections which are not uniform along a circumferential line. For these modes of deflection, the locus of points at which the generatrices will ideally intersect may slightly vary due to three dimensional effects. However, the deviation will be sufficiently slight for the significant modes of deflection. Thus, when the hub is constructed in accordance with the above teachings, the requirement of high axial rigidity and strength is met and the advantages of the invention are obtained.

It will be further obvious to those skilled in the art that, while certain embodiments have been illustrated and described, other changes and modifications may be made in the construction and arrangement of the various parts without departing from the scope of this invention.

What I claim as new and desire to secure by Letters Patent of the United States is:

1. In a turbo-fan rotor, a hub, a plurality of fan blades radially mounted about said hub, said hub comprising two opposed disc members, each of said disc members having inner and outer peripheries, means spacing respective ones of said inner peripheries farther apart than respective ones of said outer peripheries, the generatrices of the opposed surfaces of said disc members meeting at a point radially outward from the outer periphery of said hub to substantially coincide with the locus of points of axial load application upon said blades.

2. The invention of claim 1 in which one of said opposed disc members is conical.

3. The invention of claim 1 in which both of said opposed disc members are conical.

4. The invention of claim 1 in which said spacing means comprises portions integral with said inner and outer peripheries respectively of each of said disc members, means securing said portions of respective inner and outer peripheries together to form rigid inner and outer junctions, and said portions of said outer peripheries forming an axially straight abutment for the inner radial ends of said fan blades.

5. The invention of claim 1 including a plurality of ribs extending radially between and joining said disc members.

References Cited in the file of this patent
UNITED STATES PATENTS
2,937,847 Stalker _____ May 24, 1960